(12) United States Patent
Miyamoto et al.

(10) Patent No.: US 8,793,044 B2
(45) Date of Patent: Jul. 29, 2014

(54) VEHICLE CONTROL SYSTEM

(71) Applicants: Tomohiko Miyamoto, Toyota (JP); Kenjiro Nagata, Okazaki (JP)

(72) Inventors: Tomohiko Miyamoto, Toyota (JP); Kenjiro Nagata, Okazaki (JP)

(73) Assignees: Toyota Jidosha Kabushiki Kaisha, Toyota-shi (JP); Aisin Seiki Kabushiki Kaisha, Kariya-Shi (JP)

( * ) Notice: Subject to any disclaimer, the term of this patent is extended or adjusted under 35 U.S.C. 154(b) by 0 days.

(21) Appl. No.: 13/723,788

(22) Filed: Dec. 21, 2012

(65) Prior Publication Data

US 2013/0166126 A1 Jun. 27, 2013

(30) Foreign Application Priority Data

Dec. 22, 2011 (JP) ................................. 2011-281848

(51) Int. Cl.
*F04B 17/03* (2006.01)
*F04B 17/05* (2006.01)
*F04B 49/00* (2006.01)

(52) U.S. Cl.
USPC ................ 701/22; 701/51; 477/34; 417/44.1; 417/426

(58) Field of Classification Search
None
See application file for complete search history.

(56) References Cited

U.S. PATENT DOCUMENTS

| 8,475,137 | B2* | 7/2013 | Kobayashi et al. | 417/44.11 |
| 2005/0103544 | A1* | 5/2005 | Takami et al. | 180/65.2 |
| 2006/0190145 | A1* | 8/2006 | Yamamoto et al. | 701/22 |
| 2007/0119640 | A1* | 5/2007 | Ito et al. | 180/65.4 |
| 2010/0228451 | A1* | 9/2010 | Hosoya et al. | 701/51 |
| 2010/0228452 | A1* | 9/2010 | Hosoya et al. | 701/51 |
| 2011/0166727 | A1* | 7/2011 | Light et al. | 701/22 |
| 2011/0224879 | A1* | 9/2011 | Waku et al. | 701/67 |
| 2011/0307134 | A1* | 12/2011 | Yoshimi | 701/22 |
| 2012/0191322 | A1* | 7/2012 | Garrard | 701/103 |
| 2012/0244012 | A1* | 9/2012 | Kigure | 417/32 |

FOREIGN PATENT DOCUMENTS

| JP | 2004-256063 A | | 9/2004 |
| JP | 2006-046603 A | | 2/2006 |
| JP | 2006152868 A | * | 6/2006 |
| JP | 2009-115186 A | | 5/2009 |
| JP | 2009-299665 A | | 12/2009 |

* cited by examiner

*Primary Examiner* — James Trammell
*Assistant Examiner* — Demetra Smith-Stewart
(74) *Attorney, Agent, or Firm* — Gifford, Krass, Sprinkle, Anderson & Citkowski, P.C.

(57) ABSTRACT

A vehicle control system includes: a power unit including an engine and a rotating electrical machine; a power supply apparatus connected to the rotating electrical machine; an oil pump unit including a mechanical oil pump and an electric oil pump for cooling the rotating electrical machine; and a control apparatus. The control apparatus is constituted by an EOP idling determination unit that determines an idling state of the electric oil pump, and an engine starting processing unit that performs processing to drive the mechanical oil pump by starting the engine in accordance with the determination of the EOP idling determination unit.

7 Claims, 4 Drawing Sheets

VEHICLE CONTROL SYSTEM

INCORPORATION BY REFERENCE

The disclosure of Japanese Patent Application No. 2011-281848, filed on Dec. 22, 2011 including the specification, drawings and abstract, is incorporated herein by reference in its entirety.

BACKGROUND OF THE INVENTION

1. Field of the Invention

The invention relates to a vehicle control system, and more particularly to a vehicle control system for a vehicle that uses an electric oil pump to cool a rotating electrical machine.

2. Description of Related Art

A vehicle installed with a rotating electrical machine uses an oil pump that circulates a coolant in order to cool the rotating electrical machine. A vehicle installed with both a rotating electrical machine and an engine uses a mechanical oil pump connected to an output rotary shaft of the engine. When the engine stops, the mechanical oil pump also stops operating. Therefore, while the engine is stopped, an electric oil pump that is driven independently of an operation of the engine is used to cool the rotating electrical machine.

Japanese Patent Application Publication No. 2004-256063 (JP 2004-256063 A), for example, describes a control apparatus for a vehicle in which an oil pump driven by a motor/generator (M/G) or an electric oil pump is driven when, during execution of a fuel cut, a deficiency occurs in a discharge amount of a mechanical oil pump driven by an engine.

The electric oil pump can be driven independently of the engine and so on, but when air or the like is intermixed in the circulating coolant, idling occurs in the electric oil pump such that the coolant cannot be circulated sufficiently.

SUMMARY OF THE INVENTION

The invention provides a vehicle control system with which a rotating electrical machine can be cooled appropriately even when idling occurs in an electric oil pump.

A vehicle control system according to an aspect of the invention includes: a power unit including an internal combustion engine and a rotating electrical machine; an oil pump unit including an electric oil pump and a mechanical oil pump that is driven by the internal combustion engine, the oil pump unit cooling the rotating electrical machine; and a control apparatus that drives the mechanical oil pump by starting the internal combustion engine in accordance with an idling state of the electric oil pump in which the electric oil pump fails to deliver a coolant at a predetermined flow rate.

As a result, the rotating electrical machine can be cooled sufficiently by the mechanical oil pump even when idling occurs in the electric oil pump.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
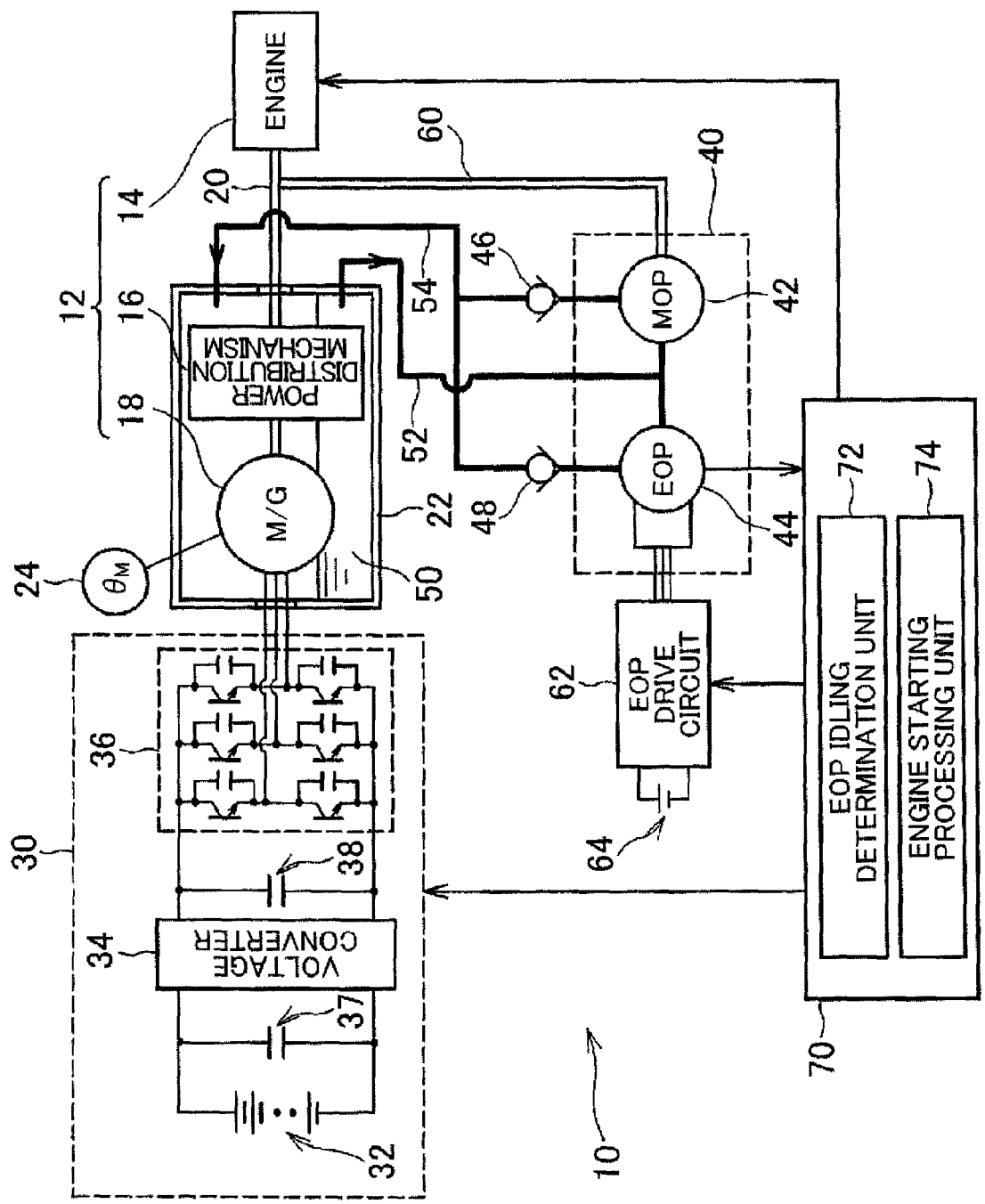
FIG. 1 is a diagram showing a configuration of a vehicle control system according to an embodiment of the invention.

An embodiment of the invention will be described in detail below using the drawings. A configuration including an engine, a single rotating electrical machine, and a power distribution mechanism provided therebetween will be described below as a power unit. However, this configuration is an example used for descriptive purposes, and the invention may be applied to any configuration including an engine and a rotating electrical machine. Further, a relationship between an output of the engine and an output of the rotating electrical machine may be modified appropriately in accordance with vehicle specifications. In the following description, a single rotating electrical machine is installed in the vehicle. However, this is also an example, and a plurality of rotating electrical machines may be installed in the vehicle. For example, a configuration in which one rotating electrical machine is used for driving and another rotating electrical machine is used for power generation may be employed. Further, separate rotating electrical machines may be used for front wheel driving and rear wheel driving.

Furthermore, in the following description, a power supply apparatus connected to the rotating electrical machine includes a storage apparatus, a voltage converter, a smoothing capacitor, and an inverter. However, only main constituent elements are described, and the power supply apparatus may include other constituent elements. For example, the power supply apparatus may also include a low voltage inverter circuit, a system main relay, a direct-current to direct-current (DC/DC) converter, and so on. Moreover, a power supply of a drive circuit for driving an electric oil pump is described as a low voltage power supply provided independently of the power supply apparatus for the rotating electrical machine. However, this is an example used for descriptive purposes, and instead, for example, power that has been voltage-converted to a low voltage may be supplied to the drive circuit of the electric oil pump from the power supply apparatus of the rotating electrical machine.

Moreover, in the following description, the rotating electrical machine and the power distribution mechanism are housed in a single case body, and a coolant circulates between an interior of the case body and an oil pump unit. However, this is an example used for descriptive purposes, and instead, for example, a configuration in which the rotating electrical machine and the power distribution mechanism are not housed in a single case and the coolant circulates between the rotating electrical machine, the power distribution mechanism, and the oil pump unit may be employed.

Identical reference numerals have been allocated to similar elements in all of the drawings, and duplicate description thereof will be omitted. Further, previously quoted reference numerals are used in the body of the description where necessary.

FIG. 1 is a diagram showing a configuration of a vehicle control system 10 for a hybrid (HV) vehicle. The vehicle control system 10 appropriately controls operations of an engine 14 and a rotating electrical machine 18 constituting a power unit 12 and also controls driving of an oil pump unit 40 for cooling the rotating electrical machine 18.

The vehicle control system 10 includes the engine 14 and the rotating electrical machine 18 as the power unit 12, which serves as a drive source of the HV vehicle. Further, the vehicle control system 10 includes, as a power supply apparatus 30 connected to the rotating electrical machine 18, a storage apparatus 32, a voltage converter 34, an inverter 36, and smoothing capacitors 37, 38. The vehicle control system 10 also includes the oil pump unit 40, which supplies a coolant 50 to an interior of a case body 22 housing the rotating electrical machine 18 so that the coolant 50 circulates through an interior of the case body 22. The oil pump unit 40 is constituted by a mechanical oil pump 42 and an electric oil pump 44. The mechanical oil pump 42 is driven by the engine 14. The electric oil pump 44 is driven by an EOP drive circuit 62, which is operated by a low voltage power supply 64. Further, the vehicle control system 10 includes a control apparatus 70 that controls the overall operations of these components.

The power unit 12 is constituted by the engine 14, the rotating electrical machine 18, and a power distribution mechanism 16. The power distribution mechanism 16 is provided between the engine 14 and the rotating electrical machine 18. The engine 14 is an internal combustion engine. The rotating electrical machine 18 is a MIG installed in the HV vehicle. The rotating electrical machine 18 is a three-phase synchronous rotating electrical machine that functions as a motor when power is supplied thereto from the power supply apparatus 30, which includes the inverter 36 as a drive circuit, and functions as a power generator when driven by the engine 14 or during a braking operation in the HV vehicle.

A temperature detector 24 provided on the rotating electrical machine 18 serves as a rotating electrical machine temperature detector that detects a temperature of the rotating electrical machine 18. Detection data from the temperature detector 24 are transmitted to the control apparatus 70 using an appropriate signal line.

The power distribution mechanism 16 is a mechanism that functions to distribute power supplied to the HV vehicle between an output of the engine 14 and an output of the rotating electrical machine 18. A planetary gear mechanism connected to three shafts, namely an output shaft of the engine 14, an output shaft of the rotating electrical machine 18, and an output shaft connected to an axle, which is not shown in the drawing, may be used as the power distribution mechanism 16. In FIG. 1, a shaft connecting the power distribution mechanism 16 to the engine 14 serves as an output shaft 20 of the engine 14. The output shaft 20 is connected to a drive shaft of the mechanical oil pump 42 via a connecting shaft 60, and is used to drive the mechanical oil pump 42.

The power supply apparatus 30 is an apparatus for driving the rotating electrical machine 18. The storage apparatus 32 provided in the power supply apparatus 30 is a chargeable/dischargeable high-voltage secondary battery. More specifically, the storage apparatus 32 is a lithium ion battery pack having a terminal voltage between approximately 200 V and 300 V. This predetermined terminal voltage is obtained in the battery pack by combining a plurality of batteries available as single cells or battery cells, respectively having terminal voltages between 1 V and several V. A nickel hydrogen battery pack, a large capacity capacitor, or the like may also be used as the storage apparatus 32.

The voltage converter 34 is disposed between the storage apparatus 32 and the inverter 36. The voltage converter 34 is a circuit having a DC voltage conversion function. The voltage converter 34 is constituted by a reactor and a switching element. The voltage conversion function includes a step-up function for stepping up a storage apparatus 32 side voltage using an energy storage action of the reactor and supplying the stepped-up voltage to the inverter 36 side, and a step-down function for stepping down power from the inverter 36 side and supplying the stepped-down power to the storage apparatus 32 side as charging power.

The inverter 36 is a drive circuit connected to the rotating electrical machine 18, and includes a plurality of switching elements, a reverse connection diode, and so on. The inverter 36 changes alternating current (AC) power into DC power, and also changes DC power into AC power. More specifically, the inverter 36 has an AC/DC conversion function for converting AC three-phase regenerative power from the rotating electrical machine 18 into DC power and supplying the DC power to the storage apparatus 32 side as a charging current when the rotating electrical machine 18 is caused to function as a power generator. Further, the inverter 36 has a DC/AC conversion function for converting DC power from the storage apparatus 32 side into AC three-phase drive power and supplying the AC three-phase drive power to the rotating electrical machine 18 as AC drive power when the rotating electrical machine 18 is caused to function as a motor.

The inverter 36 generates a three-phase drive signal by performing pulse width modulation (PWM) control to adjust the timings of switching to the ON/OFF of the plurality of switching elements appropriately, and supplies the generated three-phase drive signal to the rotating electrical machine 18. PWM control is control for modulating a pulse width by comparing a fundamental wave signal having a period that corresponds to a rotation period of the rotating electrical machine 18 with a carrier signal having a sawtooth waveform. A frequency of the carrier signal is referred to as a carrier frequency. To secure controllability in the PWM control, however, the carrier frequency is set in accordance with a frequency of the fundamental wave. For example, when a rotation speed of the rotating electrical machine 18 increases, the frequency of the fundamental wave also increases, and therefore a high carrier frequency is set. Conversely, when the rotation speed of the rotating electrical machine 18 decreases, the frequency of the fundamental wave also decreases, and therefore a low carrier period is set.

The smoothing capacitor 37 provided between the storage apparatus 32 and the voltage converter 34 is a capacitor element that functions to smooth a voltage and a current on the storage apparatus 32 side. The smoothing capacitor 38 provided between the voltage converter 34 and the inverter 36 is a capacitor element that functions to smooth a voltage and a current on the inverter 36 side.

The case body 22 is a casing housing the power distribution mechanism 16 and the rotating electrical machine 18 in its interior. The case body 22 is stores the coolant 50 in its interior space. The coolant 50 lubricates the power distribution mechanism 16 and a moving part of the rotating electrical machine 18, and cools the power distribution mechanism 16 and the rotating electrical machine 18. Lubricating oil available as automatic transmission fluid (ATF) may be used as the coolant.

The oil pump unit 40 is a unit including the mechanical oil pump 42 and the electric oil pump 44. The oil pump unit 40 functions to supply the coolant 50 to the interior space of the case body 22 such that the coolant 50 circulates. A coolant discharge passage 52 is a coolant flow pipe that connects the oil pump unit 40 to a coolant discharge port provided on a lower side of the case body 22 in a gravity direction, or in other words a location close to a bottom portion of the case body 22. A coolant supply passage 54 is a coolant flow pipe that connects the oil pump unit 40 to a coolant supply port provided on an upper side of the case body 22 in the gravity direction, or in other words a location close to a ceiling portion of the case body 22.

The mechanical oil pump 42 and the electric oil pump 44 are connected between the coolant discharge passage 52 and the coolant supply passage 54 in a mutually parallel relationship. A check valve 46 is provided between the mechanical oil pump 42 and the coolant supply port of the case body 22 to prevent backflow of the coolant 50. Similarly, a check valve 48 is provided between the electric oil pump 44 and the coolant supply port of the case body 22 to prevent backflow of the coolant 50.

The drive shaft of the mechanical oil pump 42, shown as MOP in FIG. 1, is connected to the output shaft 20 of the engine 14 via the connecting shaft 60. The mechanical oil pump 42 is driven when the engine 14 is operated. In other words, driving of the mechanical oil pump 42 is started when the engine 14 is started and stopped when the engine 14 is stopped. The electric oil pump 44, shown as EOP in FIG. 1, is driven by an EOP drive circuit 62 in response to a control signal from the control apparatus 70. DC power is supplied to the EOP drive circuit 62 from the low voltage power supply 64. The low voltage is a lower voltage than the voltage of the storage apparatus 32, and a voltage between approximately 12 V and 16 V, for example, may be used as the low voltage. A three-phase synchronous motor may be used as a motor for rotating a drive shaft of the electric oil pump 44. In this case, the EOP drive circuit 62 includes an inverter having a DC/AC conversion function. Note that a single phase AC motor or a DC motor may be used instead of the three-phase synchronous motor. Content of the EOP drive circuit 62 is modified in accordance with the type of motor used as the motor for rotating the drive shaft of the electric oil pump 44.

The control apparatus 70 is a control circuit that functions to perform overall control of the respective elements described above. Here in particular, however, the control apparatus 70 functions to perform control for circulating the coolant 50 appropriately so that the rotating electrical machine 18 and so on are cooled appropriately when idling occurs in the electric oil pump 44 due to intermixing of air or the like. The control apparatus 70 may be constituted by a computer suitable for installation in a vehicle.

The control apparatus 70 includes an EOP idling determination unit 72 and an engine starting processing unit 74. The EOP idling determination unit 72 determines an idling state of the electric oil pump 44. The engine starting processing unit 74 performs processing to drive the mechanical oil pump 42 by starting the engine 14 in accordance with the determination of the EOP idling determination unit 72. These functions can be realized by executing software. More specifically, these functions can be realized by executing an EOP idling processing program.

Figure 2:
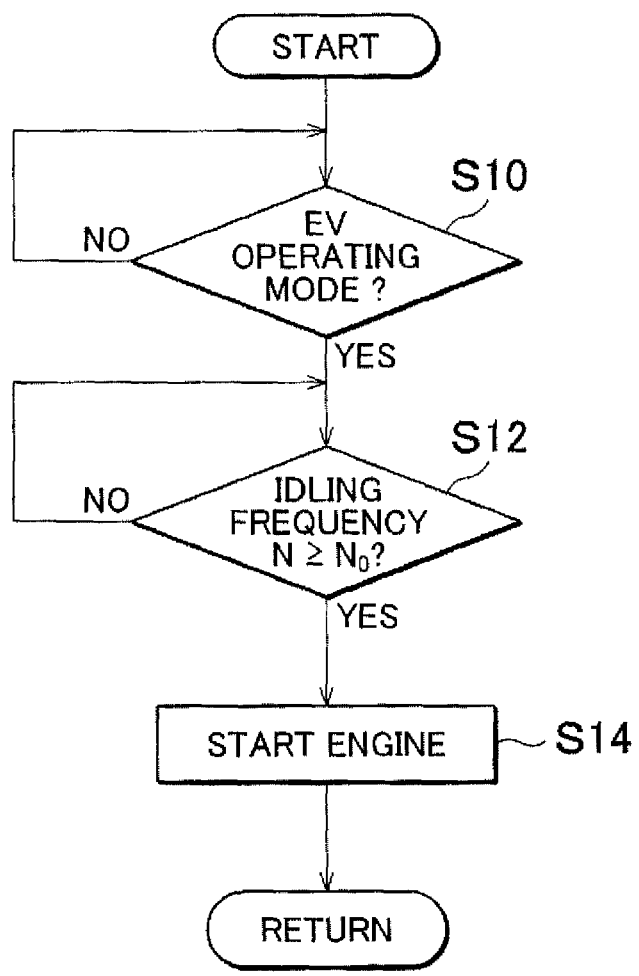
FIG. 2 is a flowchart showing control procedures executed when idling occurs in an electric oil pump, according to this embodiment of the invention.

FIG. 2 is a flowchart showing control procedures executed when idling occurs in the electric oil pump 44. Each procedure corresponds to a processing procedure of the EOP idling processing program. When the HV vehicle is operative, a determination is made as to whether or not an operating mode of the power unit 12 is an electrical vehicle (EV) operating mode (S10). The EV operating mode is a mode in which the rotating electrical machine 18 is operated without operating the engine 14 constituted by an internal combustion engine. At this time, the HV vehicle travels using only the output of the rotating electrical machine 18.

The HV vehicle has another operating mode, namely a HV operating mode in which both the engine 14 and the rotating electrical machine 18 can be operated. The operating mode of the power unit 12 is switched by the control apparatus 70. More specifically, the control apparatus 70 obtains a requirement of a user on the basis of operations of an accelerator pedal, a brake, and so on by the user. The control apparatus 70 then converts the requirement of the user into a required output and a required vehicle speed. Selection of the EV operating mode or the HV operating mode is performed in accordance with the conversion result. When the EV operating mode is selected, the control apparatus 70 stops the engine 14. When the HV operating mode is selected, the control apparatus 70 performs control for switching between travel using only the output of the engine 14, travel using a combination of the output of the engine 14 and the output of the rotating electrical machine 18, and travel using only the output of the rotating electrical machine 18 in accordance with a travel state of the vehicle.

Hence, when the operating mode of the power unit 12 is the EV operating mode, the engine 14 is stopped, and therefore the mechanical oil pump 42 is also stopped. In the EV operating mode, therefore, only the electric oil pump 44 can be driven. When the operating mode of the power unit 12 is the HV operating mode, on the other hand, the mechanical oil pump 42 is driven as the engine 14 is operated. At this time, the electric oil pump 44 may be driven or stopped in accordance with a command from the control apparatus 70. Hence, in the HV operating mode, both the mechanical oil pump 42 and the electric oil pump 44 can be driven.

When the determination of S10 in FIG. 2 is affirmative, this means that the engine 14 of the power unit 12 is stopped, and therefore that the mechanical oil pump 42 of the oil pump unit 40 is stopped. In this case, the temperature of the rotating electrical machine 18 is appropriately high, and it is therefore assumed from the temperature that the electric oil pump 44 is in a driven state.

In this state, the idling state of the electric oil pump 44 is determined. The idling state may be determined using a predetermined determination reference. A threshold of a idling frequency, which is a number of idling revolutions per unit time, may be used as the determination reference. For example, a limit idling frequency at which the electric oil pump 44 fails to deliver the coolant 50 at a predetermined flow rate to the coolant supply passage 54 is set as a threshold frequency $N_0$, and a determination is made as to whether or not an actual idling frequency N equals or exceeds the threshold frequency $N_0$ (S12). The processing procedure of S12 is executed by a function of the EOP idling determination unit 72 of the control apparatus 70.

A threshold of a idling time may also be used as the determination reference. A idling period may be used as the idling time. For example, a limit idling period at which the electric oil pump 44 fails to deliver the coolant 50 at the predetermined flow rate to the coolant supply passage 54 may be set as a threshold time $t_0$, and a determination may be made as to whether or not an actual idling period t equals or exceeds the threshold time $t_0$.

Hence, the idling frequency, i.e. the number of idling revolutions per unit time, of the electric oil pump 44 or the idling period of the electric oil pump 44 is used as a value based on an operating state parameter.

Establishment of the idling state in the electric oil pump 44 is determined by detecting the idling state. The operating state of the electric oil pump 44 may be determined by monitoring a rotation speed, a drive current value, and so on. When idling occurs in the electric oil pump 44, operating state parameters such as the rotation speed and the drive current value change rapidly. Therefore, limit values of the operating state parameters of the electric oil pump 44 at which idling can be detected may be gathered in advance through experiment or the like, and these limit values can be used as thresholds for determining the idling state. The idling frequency N can be obtained by counting a number of revolutions per unit time in which the operating parameter exceeds the corresponding threshold. The idling period t can be obtained by measuring a time during which the operating parameter exceeds the corresponding threshold continuously. In other words, the determination reference is set on the basis of the idling frequency or the idling time of the electric oil pump. As a result, erroneous detection can be prevented, and idling that impairs cooling of the rotating electrical machine can be detected appropriately.

For example, idling may occur in the electric oil pump 44 when the electric oil pump 44 is driven while the HV vehicle is in a low temperature environment. In a low temperature environment, the ATF serving as the coolant 50 increases in viscosity, leading to a reduction in a fluidity of the coolant 50. As a result, the coolant 50 does not flow sufficiently even when the electric oil pump 44 is driven in order to rotate a rotary body of the pump, and in the meantime, air becomes intermixed in the coolant 50. When air is intermixed in the viscous coolant 50, the electric oil pump 44 becomes even less able to deliver the coolant 50, and therefore idling occurs.

Figure 3A:
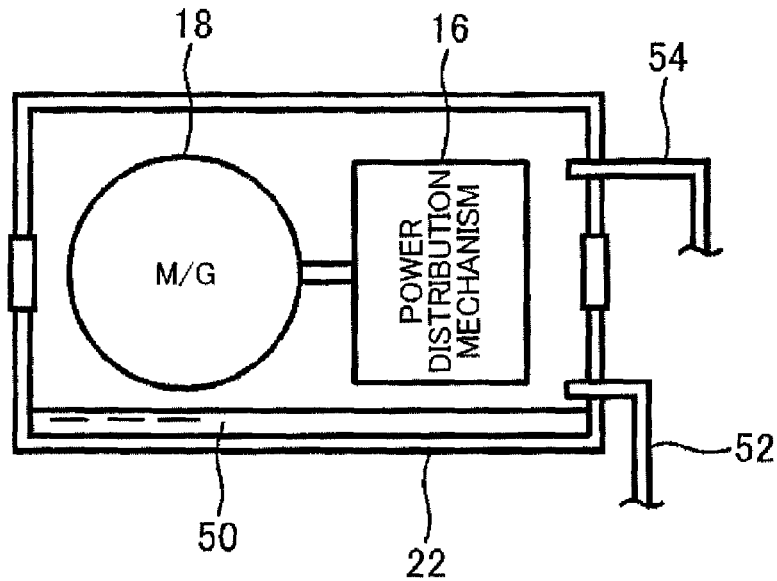
FIG. 3A is a view illustrating an example of a case in which idling occurs in the electric oil pump, according to this embodiment of the invention.
Figure 3B:
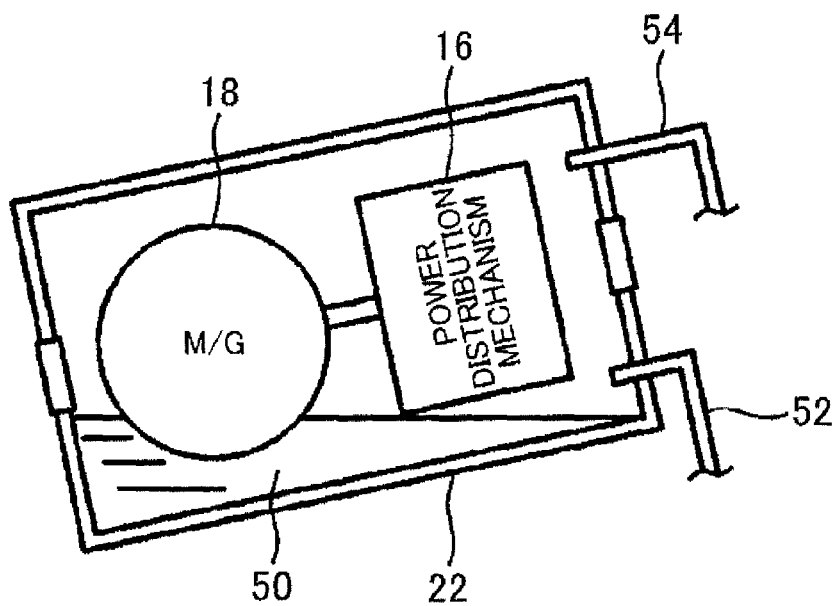
FIG. 3B is a view illustrating an example of a case in which idling occurs in the electric oil pump, according to this embodiment of the invention.

Other specific examples in which idling may occur in the electric oil pump 44 are shown in FIG. 3A and FIG. 3B. FIG. 3A shows a state immediately after the HV vehicle is operated. In this case, an amount of coolant 50 stored in the case body 22 is small, and therefore a position of a coolant liquid level is lower than a height of the coolant discharge port. When the electric oil pump 44 is driven at this time, the coolant 50 cannot be suctioned through the coolant discharge passage 52, and therefore air is suctioned instead. As a result, idling occurs in the electric oil pump 44.

FIG. 3B shows a state in which the HV vehicle travels on a slope or turns on a sharp curve, causing a vehicle body to tilt such that the liquid level of the coolant 50 inclines relative to a bottom surface of the case body 22. Likewise in this case, the position of the coolant liquid level is lower than the height of the coolant discharge passage 52. When the electric oil pump 44 is driven at this time, the coolant 50 cannot be suctioned through the coolant discharge port, and therefore air is suctioned instead. As a result, idling occurs in the electric oil pump 44.

Hence, idling occurs in the electric oil pump 44 when the HV vehicle is in a low temperature environment, immediately after startup of the HV vehicle, while the HV vehicle travels on a slope, while the HV vehicle turns, and so on. Accordingly, a parameter representing a vehicle state of the HV vehicle may be used as the determination reference. For example, it may be determined that idling has occurred when an air temperature on the outside of the HV vehicle is no higher than a predetermined threshold temperature. Further, it may be determined that idling has occurred when a time immediately after startup of the HV vehicle is within a predetermined threshold time range. It may also be determined that idling has occurred when the HV vehicle is on a slope and an incline angle of the slope exceeds a predetermined threshold angle. Furthermore, it may be determined that idling has occurred when the HV vehicle is turning and a turning acceleration exceeds a predetermined threshold acceleration.

Returning to FIG. 2, when the determination of S12 is affirmative, the engine 14 is started (S14). The engine 14 can be started by switching the operating mode of the power unit 12 from the EV operating mode to the HV operating mode. Hence, when the EV operating mode, in which the rotating electrical machine is operated without operating the internal combustion engine, is set, the mechanical oil pump is driven by starting the internal combustion engine in accordance with the idling state of the electric oil pump. Driving of the mechanical oil pump 42 begins at the same time as the engine 14 is started. Accordingly, the state in which the coolant 50 cannot be delivered sufficiently by the electric oil pump 44 alone is resolved such that the coolant 50 can be supplied sufficiently to the rotating electrical machine 18 and so on. The processing procedure of S14 is executed by a function of the engine starting processing unit 74 of the control apparatus 70. As a result, the rotating electrical machine can be cooled sufficiently by the mechanical oil pump even when idling occurs in the electric oil pump.

Figure 4:
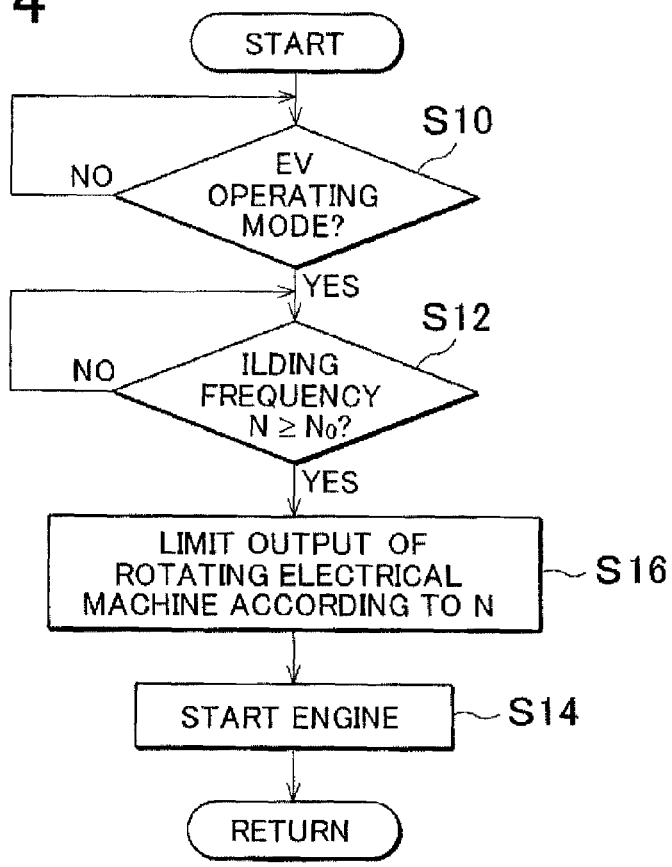
FIG. 4 is a flowchart showing procedures executed when control is performed in accordance with the idling occurring in the electric oil pump, according to this embodiment of the invention.

It is assumed in the above description that when idling is determined to have occurred in the electric oil pump 44, the engine 14 is started by switching the operating mode of the power unit 12 from the EV operating mode to the HV operating mode. In this case, however, a fuel efficiency of the HV vehicle may deteriorate. FIG. 4 is a flowchart showing procedures for suppressing deterioration of the fuel efficiency of the HV vehicle.

In FIGS. 4, S10 and S12 are identical in content to S10 and S12 of FIG. 2, respectively, and therefore description thereof has been omitted. When the determination of S12 in FIG. 4 is affirmative, the output of the rotating electrical machine 18 is limited in accordance with a degree by which the operating state of the electric oil pump 44 exceeds the determination reference. When the threshold frequency $N_0$ relating to the idling frequency N is used as the determination reference in S12, the output of the rotating electrical machine 18 is limited in accordance with the idling frequency N (S16).

Figure 5:
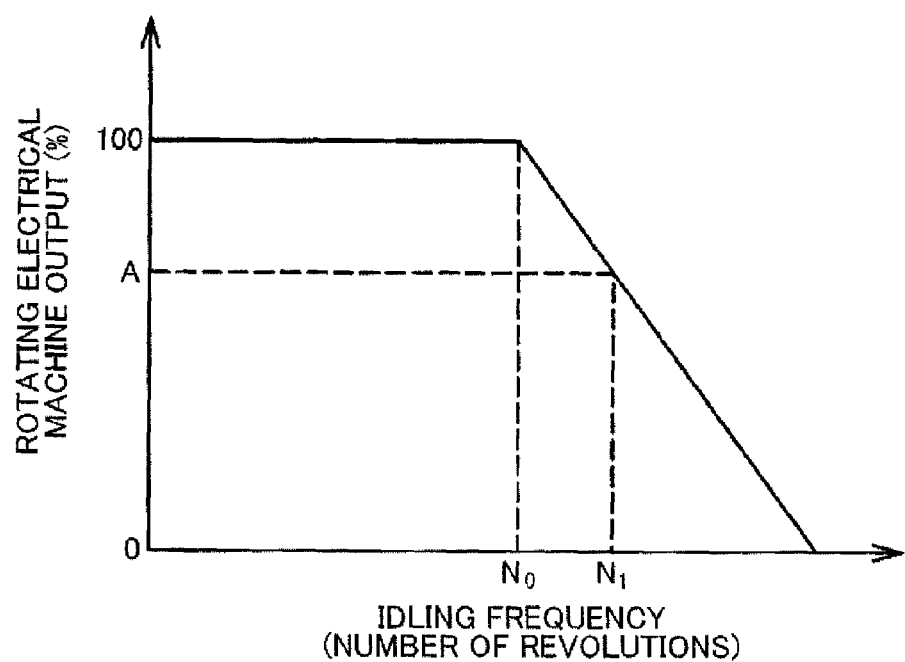
FIG. 5 is a view illustrating an output limitation applied to a rotating electrical machine in accordance with the idling in FIG. 4.

FIG. 5 is a view showing a relationship between the idling frequency N and the output of the rotating electrical machine 18. The idling frequency N is shown on an abscissa and the output of the rotating electrical machine 18 is shown on an ordinate. On the ordinate, the output of the rotating electrical machine 18 following output limitation is shown as a percentage, the output of the rotating electrical machine 18 when idling has not occurred being set at a reference of 100%. The output of the rotating electrical machine 18 is not limited until the idling frequency N reaches the threshold frequency $N_0$. When the idling frequency N reaches or exceeds the threshold frequency $N_0$, the output limitation on the rotating electrical machine 18 is set to be steadily larger as $(N-N_0)$ increases.

In the example of FIG. 5, the output limitation is set at A % when the idling frequency is $N_1$. An output limitation of A % is determined as an output at which the rotating electrical machine 18 can be cooled sufficiently by the electric oil pump 44 alone when the idling frequency is $N_1$. For example, when the idling frequency is $N_1$, a cooling ability of the electric oil pump 44 is assumed to decrease by 10%. At a cooling ability of the electric oil pump 44 when idling has not occurred, the rotating electrical machine 18 is assumed to be capable of a maximum output of B (kW). Hence, when the cooling ability of the electric oil pump 44 decreases by 10%, the rotating electrical machine 18 is assumed to be capable of a maximum output of C (kW). In this case, A % in FIG. 5 is given by A %=(C/B)×100%. By determining these data in advance through experiment or simulation, a map such as that shown in FIG. 5 can be obtained.

Further, the output of the rotating electrical machine is limited in accordance with the degree by which the operating state of the electric oil pump exceeds the determination reference. Output limitation is performed such that an increase in the temperature of the rotating electrical machine remains within a predetermined range even when idling occurs in the electric oil pump. Hence, when idling occurs in the electric oil pump 44, the output of the rotating electrical machine 18 is throttled to a degree at which cooling can be performed in the idling state. In so doing, it is no longer necessary to switch from the EV operating mode to the HV operating mode, as shown in FIG. 2. As a result, deterioration of the fuel efficiency of the HV vehicle can be suppressed.

Incidentally, when the output of the rotating electrical machine 18 is throttled, the output of the power unit 12 is correspondingly unable to satisfy the required output of the user. In this case, the engine 14 is started (S14) and the output of the engine 14 is used to compensate for the output deficiency. The output of the engine 14 in this case serves as an assist output used to compensate for a deficiency in the output of the rotating electrical machine 18. In the case of FIG. 2, the EV operating mode is switched to the HV operating mode, and therefore the required output is covered by the engine 14 alone while, depending on the state of vehicle travel, either the rotating electrical machine 18 is caused to perform an assist operation or travel is performed using the rotating electrical machine 18 alone. Hence, with FIG. 4, an overall fuel efficiency of the HV vehicle can be improved in comparison with FIG. 2.

Therefore, the control apparatus starts the internal combustion engine by switching the operating mode of the power unit from the EV operating mode, in which the rotating electrical machine is operated without operating the internal combustion engine, to the HV operating mode, in which both the internal combustion engine and the rotating electrical machine can be operated. By switching the operating mode of the power unit in this manner, the mechanical oil pump is driven reliably.

Further, the control apparatus limits the output of the rotating electrical machine in accordance with the degree by which the operating state of the electric oil pump exceeds the determination reference, and starts the internal combustion engine when, as a result, the required output of the vehicle is not satisfied. By starting the internal combustion engine when necessary, the limited output of the rotating electrical machine can be compensated for using the output of the internal combustion engine.

The vehicle control system according to the invention can be used in a vehicle installed with a mechanical oil pump and an electric oil pump.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A vehicle control system comprising
   a power unit including an internal combustion engine and a rotating electrical machine;
   an oil pump unit including an electric oil pump and a mechanical oil pump that is driven by the internal combustion engine, the oil pump unit cooling the rotating electrical machine; and
   a control apparatus that drives the mechanical oil pump, by starting the internal combustion engine, when the electric oil pump is in an idling state in which the electric oil pump fails to deliver a coolant at a predetermined flow rate and when a parameter related to an operating state of the electric oil pump exceeds a predetermined determination reference, the control apparatus limits an output of the rotating electrical machine in accordance with a degree by which the parameter related to the operating state of the electric oil pump exceeds the predetermined determination reference.

2. The vehicle control system according to claim 1, wherein the control apparatus starts the internal combustion engine when a required output of a vehicle is not satisfied by the limited output of the rotating electrical machine.

3. The vehicle control system according to claim 1, wherein the control apparatus starts the internal combustion engine by switching an operating mode of the power unit from an EV operating mode in which the rotating electrical machine is operated without operating the internal combustion engine to an HV operating mode in which both the internal combustion engine and the rotating electrical machine can be operated.

4. A vehicle control system comprising:
   a power unit including an internal combustion engine and a rotating electrical machine;
   an oil pump unit including an electric oil pump and a mechanical oil pump that is driven by the internal combustion engine, the oil pump unit cooling the rotating electrical machine; and
   a control apparatus that drives the mechanical oil pump, by starting the internal combustion engine, when the electric oil pump is in an idling state in which the electric oil pump fails to deliver a coolant at a predetermined flow rate and when a parameter related to an operating state of the electric oil pump exceeds a predetermined determination reference set on the basis of a frequency with which idling occurs in the electric oil pump.

5. The vehicle control system according to claim 4, wherein the control apparatus starts the internal combustion engine by switching an operating mode of the power unit from an EV operating mode in which the rotating electrical machine is operated without operating the internal combustion engine to an HV operating mode in which both the internal combustion engine and the rotating electrical machine can be operated.

6. A vehicle control system comprising:
   a power unit including an internal combustion engine and a rotating electrical machine;
   an oil pump unit including an electric oil pump and a mechanical oil pump that is driven by the internal combustion engine, the oil pump unit cooling the rotating electrical machine; and
   a control apparatus that drives the mechanical oil pump, by starting the internal combustion engine, when the electric oil pump is in an idling state in which the electric oil pump fails to deliver a coolant at a predetermined flow rate and when a parameter related to an operating state of the electric oil pump exceeds a predetermined determination reference set on the basis of a period of idling in the electric oil pump.

7. The vehicle control system according to claim 6, wherein the control apparatus starts the internal combustion engine by switching an operating mode of the power unit from an EV operating mode in which the rotating electrical machine is operated without operating the internal combustion engine to an HV operating mode in which both the internal combustion engine and the rotating electrical machine can be operated.

* * * * *